United States Patent

Wu

[11] Patent Number: 6,152,463
[45] Date of Patent: Nov. 28, 2000

[54] HANDLE MOUNTING ARRANGEMENT FOR A GOLF CART

[76] Inventor: David Wu, No. 35-1, Jih Hsin Street, Tu Cheng City, Taipei Hsien, Taiwan

[21] Appl. No.: 09/317,981

[22] Filed: May 25, 1999

[51] Int. Cl.[7] .................................................. B62B 1/04
[52] U.S. Cl. ................................. 280/47.17; 280/DIG. 5; 280/DIG. 6
[58] Field of Search ........................ 16/444, 445; 74/543; 267/248, 253, 167; 280/40, 42, 645, 652, 655, 646, DIG. 5, DIG. 6, 485, 47.17

[56] References Cited

U.S. PATENT DOCUMENTS

| | | | |
|---|---|---|---|
| 3,993,320 | 11/1976 | Robinson | 280/485 |
| 4,829,846 | 5/1989 | DeSalvo et al. | 74/543 |
| 5,106,117 | 4/1992 | Wang | 280/DIG. 6 |
| 5,154,435 | 10/1992 | Chiu | 280/DIG. 6 |
| 6,048,037 | 4/2000 | Cheng | 280/655 |

*Primary Examiner*—Michael Mar
*Assistant Examiner*—Hau Phan
*Attorney, Agent, or Firm*—Varndell & Varndell, PLLC

[57] ABSTRACT

A handle mounting arrangement, which includes a coupling block fixedly fastened to the main rod member of a golf cart, a handle pivoted to the coupling block, and a spring member connected between the coupling block and a stop flange at the handle to absorb shocks transmitted from the main ground member of the golf cart to the handle upon movement of the golf cart on an uneven rod surface.

2 Claims, 6 Drawing Sheets

HANDLE MOUNTING ARRANGEMENT FOR A GOLF CART

BACKGROUND AND SUMMARY OF THE INVENTION

The present invention relates to a golf cart, and more specifically to the handle mounting arrangement of a golf cart which has spring means that absorb shocks when the golf cart runs over an uneben road surface.

A regular golf cart comprises a handle at the front side of the main rod member (see FIG. 1). Because the handle is fixedly connected to the main rod member, shocks are directly transmitted to the user's hand when the golf cart is moved on an uneven road surface.

The present invention provides a handle mounting arrangement for a golf cart, which absorbs shocks when the golf cart is moved on an uneven road surface. To achieve these and other objects of the present invention, there is provided a handle mounting arrangement, which comprises a coupling block fixedly fastened to the main rod member of a golf cart, a handle pivoted to the coupling block, the handle having a stop flange adjacent to the coupling block, and a spring member connected between the coupling block and the stop flange at the handle to absorb shocks transmitted from the main rod member of the golf cart to the handle upon movement of the golf cart on an uneven rod surface.

DETAILED DESCRIPTION OF THE PREFERRED EMBODIMENT

Figure 1:
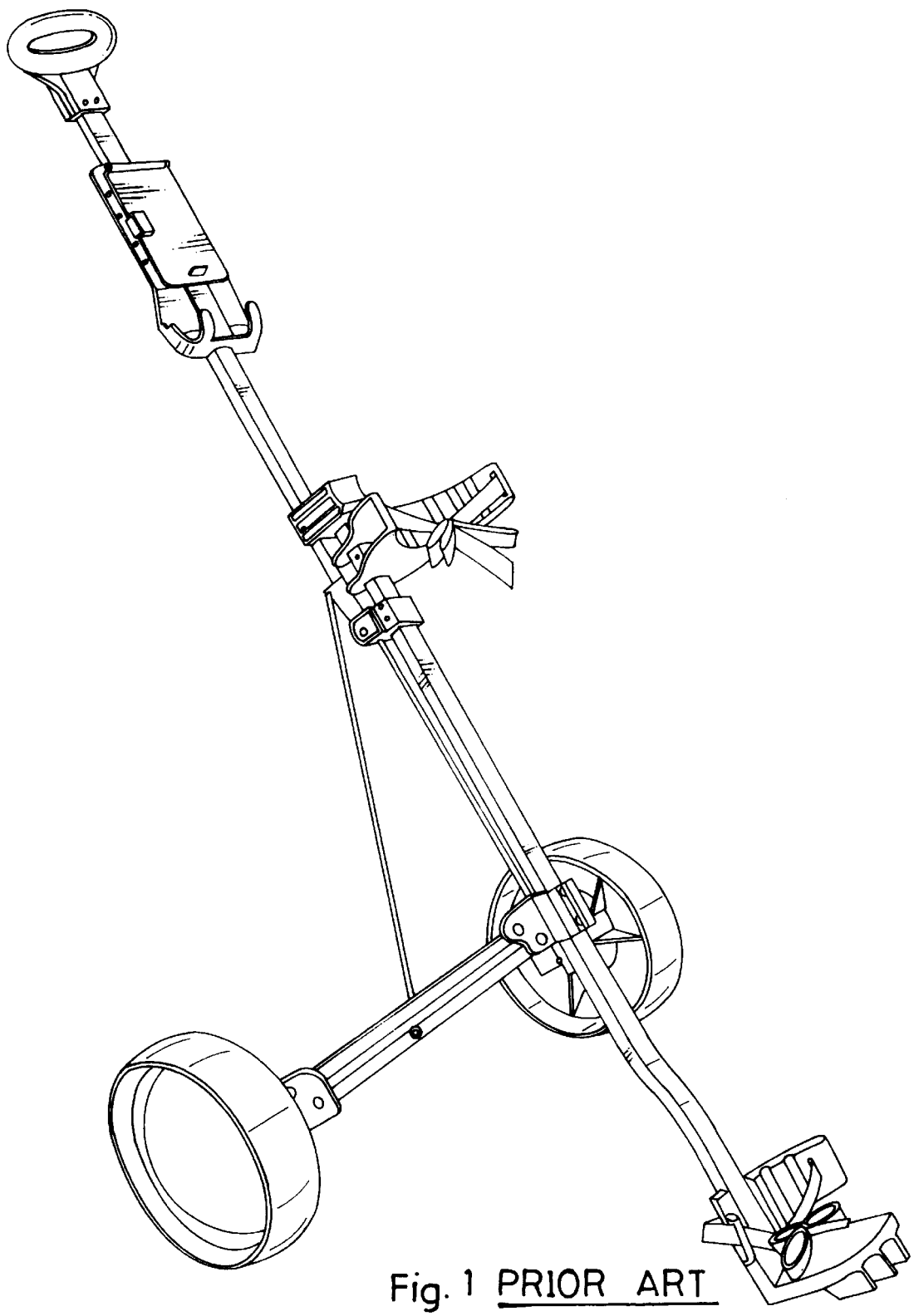
FIG. 1 is a perspective view of a golf cart according to the prior art.
Figure 2:
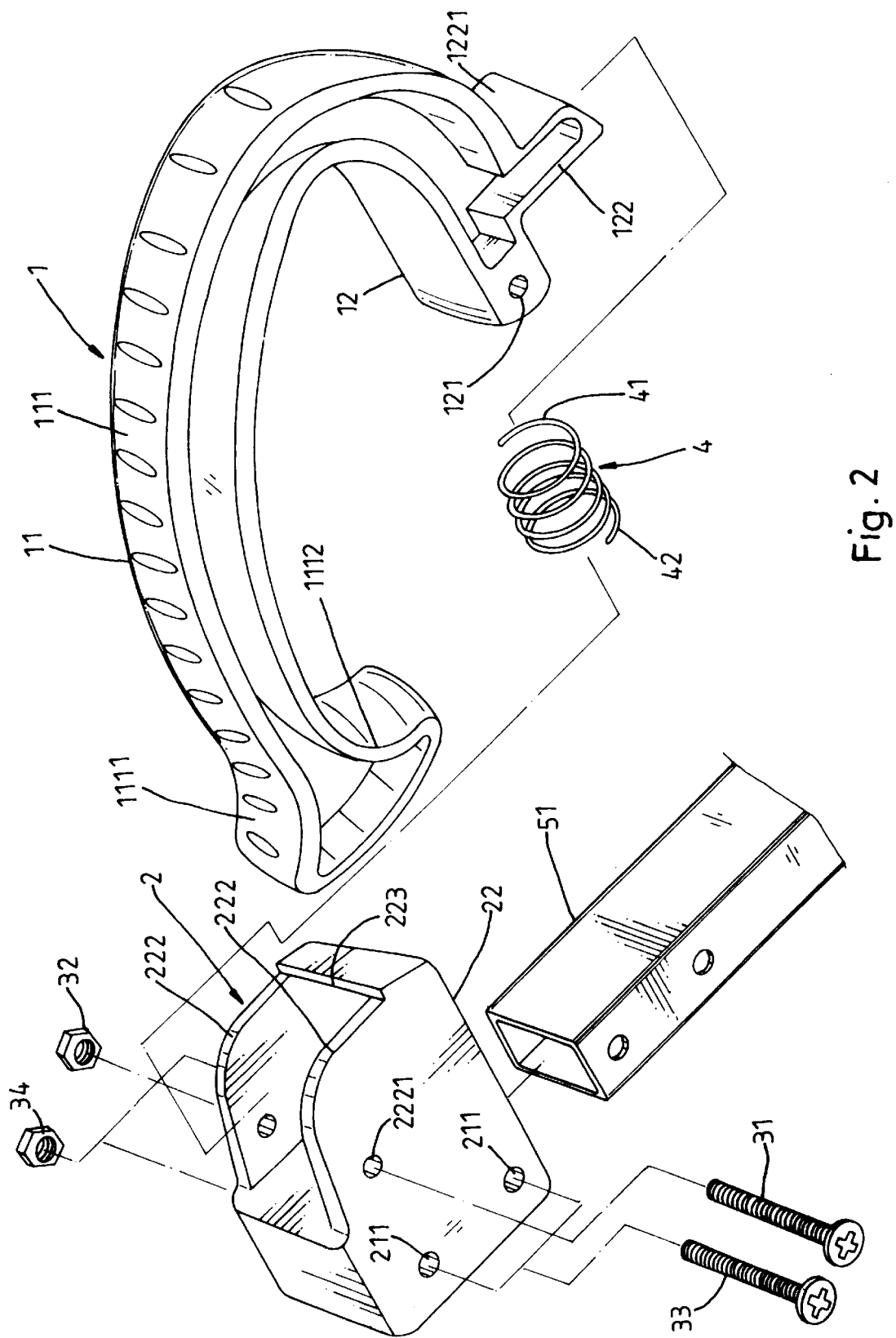
FIG. 2 is an exploded view of a handle mounting arrangement according to the present invention.
Figure 3:
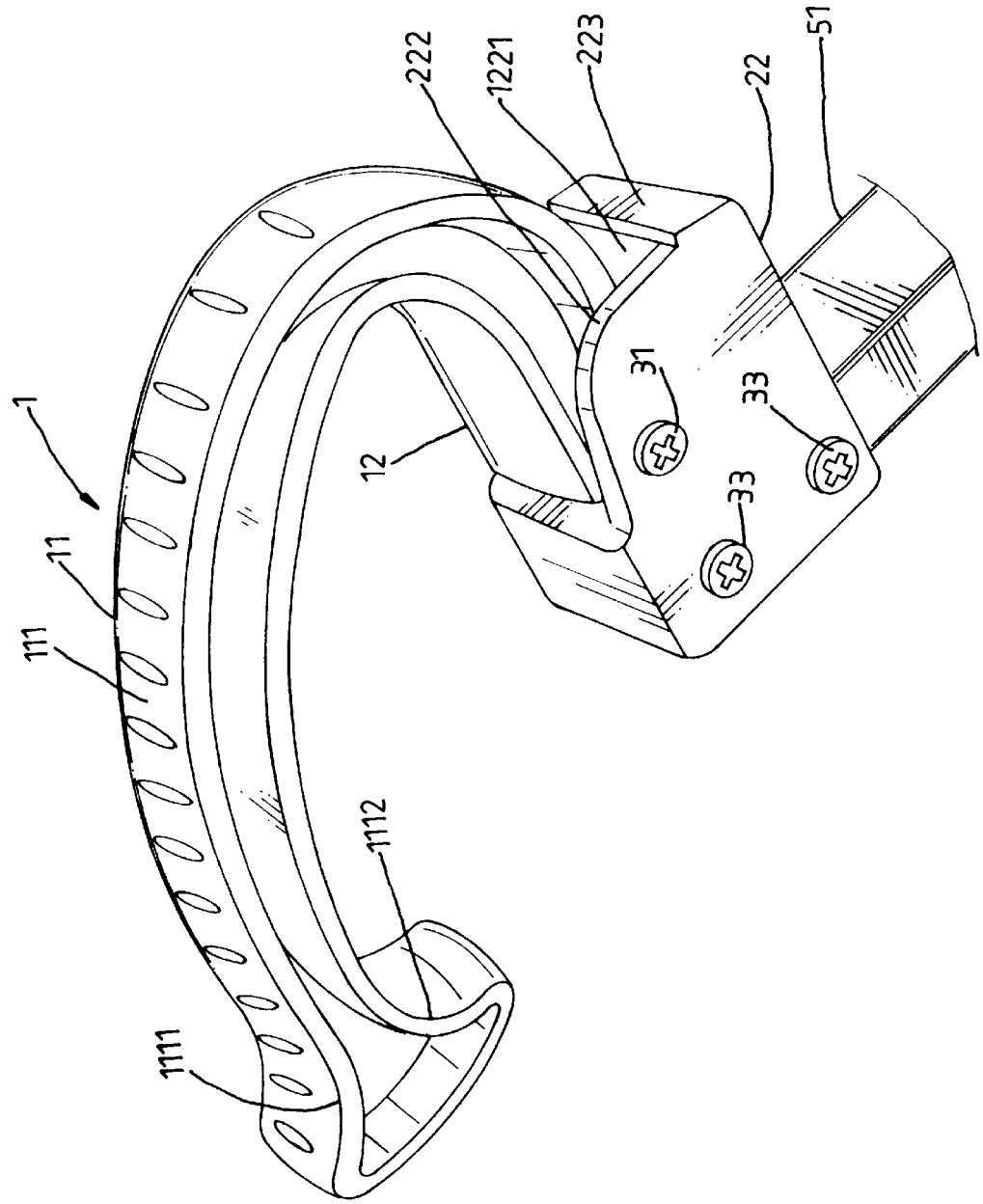
FIG. 3 is a perspective assembly view of FIG. 2.

Referring to FIGS. from 2 through 6, a handle mounting arrangement for a golf cart is shown comprised of a handle 1, a coupling block 2, and a spring member 4.

The handle 1 comprises a hand grip 11, and a coupling unit 12 formed integral with one end, namely, the rear end of the hand grip 11. The coupling unit 12 comprises a pivot hole 121 pivoted to the first pivot holes 2221 of coupling block 2, and a projecting stop flange 122 supported on the spirng member 4.

Figure 6:
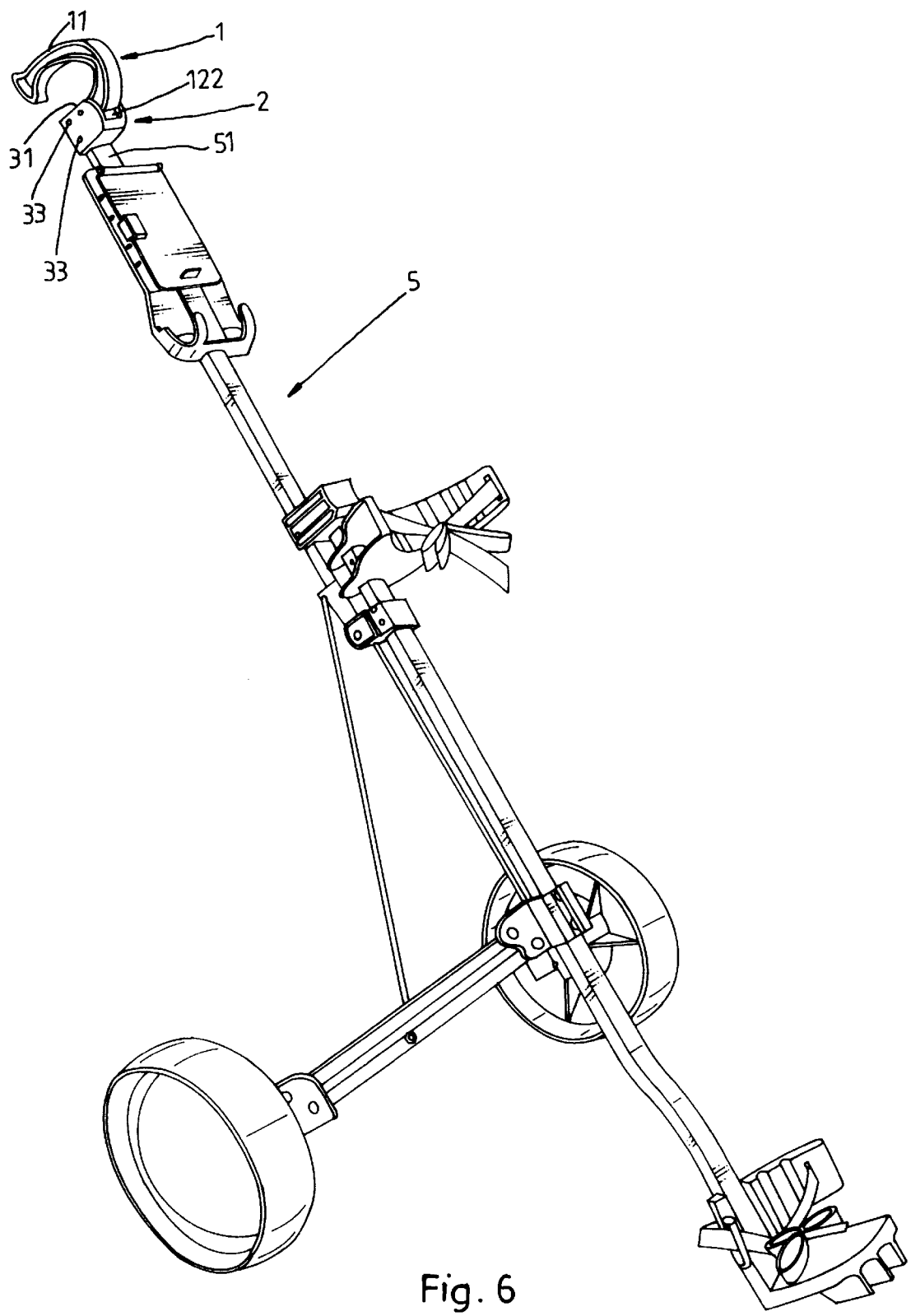
FIG. 6 is an installed view of the present invention, showing the handle mounting arrangement installed in the main rod member of a golf cart.

The coupling block 2 comprises a coupling chamber 21, which receives the main rod member 51 of the golf cart 5 (see FIG. 6), a receiving chamber 22, which receives the spring member 4 and the coupling unit 12 of the handle 1, two mounting holes 211 transversely provided across the ocupling chamber 21 and respectively fastened to respective mounting holes at the main rod member 51 of the golf cart 5 by a respective screw bolt 33 and a respective nut 34, and a pivot hole 2221 provided across two opposite side walls 222 of the receiving chamber 22 and pivotably connected to the pivot hole 121 at the coupling unit 12 of the handle 1 by a screw bolt 31 and a nut 32.

Figure 4:
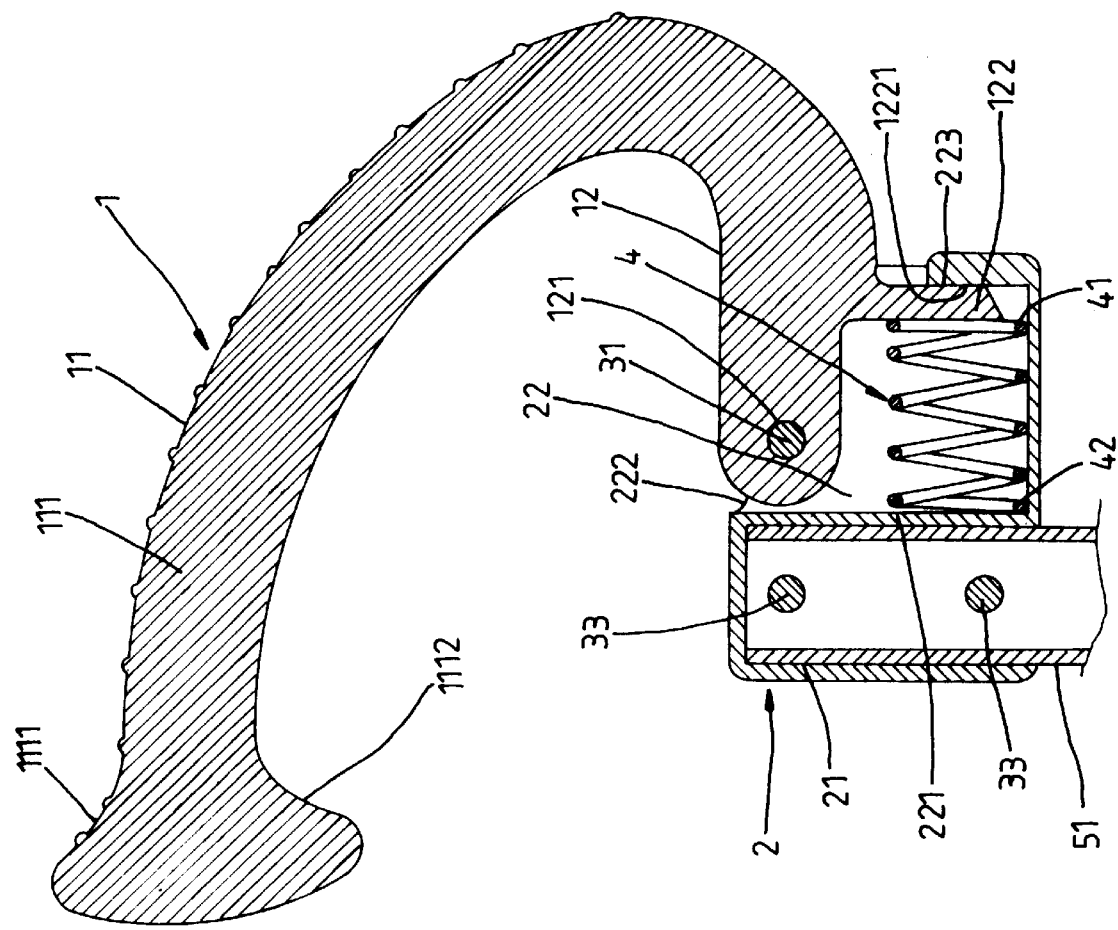
FIG. 4 is a sectional view of the assembly of FIG. 3.

The spring member 4 has one end 42 stopped at the bottom side wall 221 of the receiving chamber 22, and an opposite end 41 stopped at one side wall, namely, the bottom side wall of the stop flange 122 of the coupling unit 12 of the handle 1. The spring member 4 imparts an outward pressure to the stop flange 122 of the coupling unit 12 of the handle 1, causing the top side wall of the stop flange 122 to be stopped at the top side wall 223 of the receiving chamber 22 (see FIG. 4).

Figure 5:
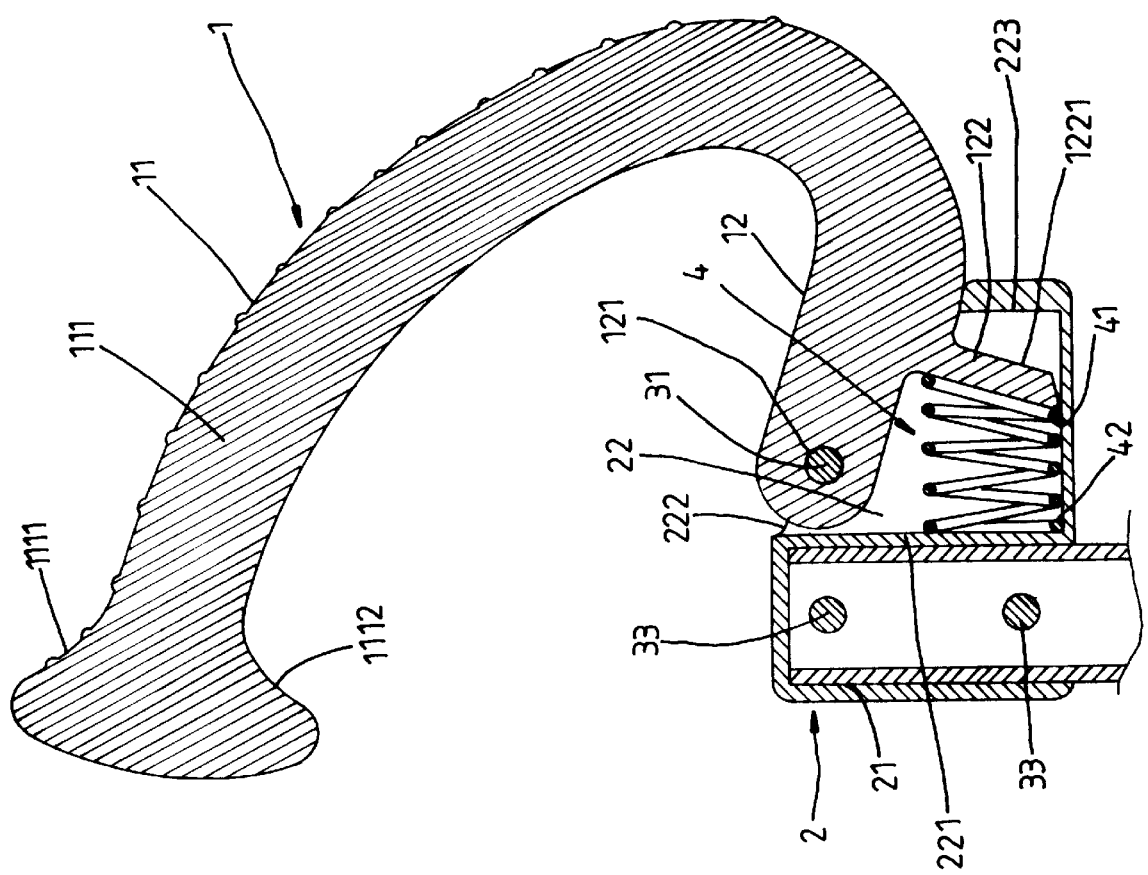
FIG. 5 is similar to FIG. 4 but showing the spring member compressed.

When the golf cart 5 is moved over an uneven road surface, the spring member 4 is alternatively compressed (see FIG. 5) and released (see FIG. 4) to absorb shocks.

The handl grip 11 of the handle 1 comprises a smoothly arched body 111 having a front end (the end remote from the coupling unit 12) terminating in a smoothly curved thumb rest portion 1111 at the top for the resting of the thumb and a smoothly curved forefinger rest portion 1112 at the bottom for the resting of the forefinger.

What is claimed is:

1. A handle mounting arrangement connected to a main rod member of a wheeled golf cart, comprising:

a handle, said handle comprising a hand grip having a front end and a rear end, and a coupling unit formed integral with the rear end of said hand grip, said coupling unit comprising a pivot hole, and a projecting stop flange at said rear end;

a coupling block, said coupling block comprising a coupling chamber, which receives the main rod member of the wheeled golf cart, a receiving chamber, two mounting holes transversely provided across said coupling chamber and respectively fastened to respective mounting holes at the main rod member of the wheeled golf cart by a respectively screw bolt and a respective nut, and a pivot hole provided across two opposite side walls of said receiving chamber and pivotably connected to the pivot hole at the coupling unit of said handle by a screw bolt and a nut; and a spring member received in said receiving chamber, said spring having one end abutting at a bottom side wall of said receiving chamber, and an opposite end abutting at a bottom side wall of said stop flange of said coupling unit of said handle to bias said stop flange in a direction away from said bottom side wall of said receiving chamber, for absorbing vibrations transmitted by the main rod member to the handle when the wheeled golf cart is traveling across an uneven terrain by said spring member compressing when the handle is being grasped by a user.

2. The handle mounting arrangement of claim 1, wherein said hand grip comprises a smoothly arched body having a front end terminating in a smoothly curved thumb rest portion at a top side for resting of the thumb and a smoothly curve forefinger rest portion at a bottom for the resting of the forefinger.

* * * * *